Feb. 14, 1967    R. A. DOVERSBERGER    3,304,076
SUSPENSION UNIT
Filed Dec. 31, 1964
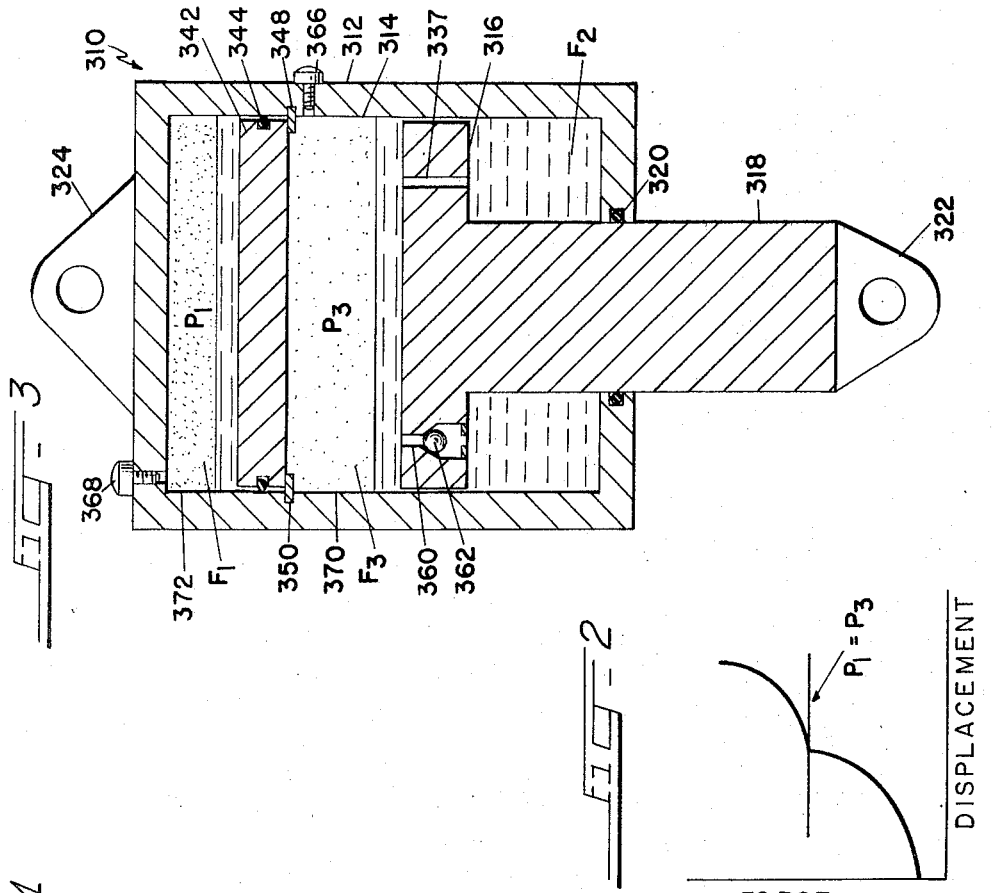
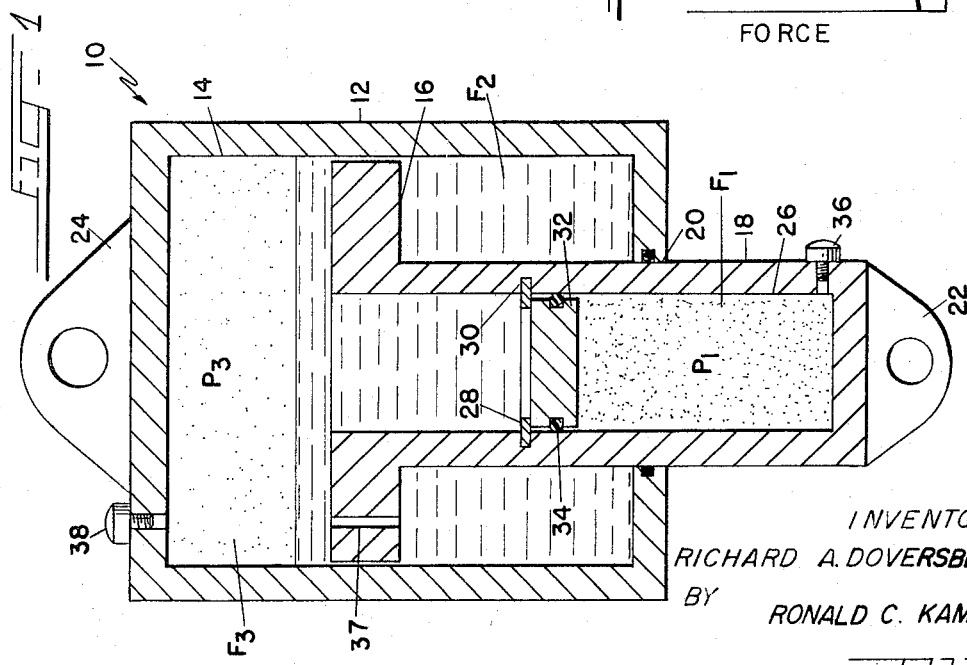
INVENTOR:
RICHARD A. DOVERSBERGER
BY RONALD C. KAMP

United States Patent Office 3,304,076
Patented Feb. 14, 1967

3,304,076
SUSPENSION UNIT
Richard A. Doversberger, Peoria, Ill., assignor to LeTourneau-Westinghouse Company, Peoria, Ill., a corporation of Illinois
Filed Dec. 31, 1964, Ser. No. 422,714
3 Claims. (Cl. 267—64)

The present invention relates generally to hydro-pneumatic suspension units for vehicles, and more particularly, to hydro-pneumatic suspension units having two distinct ranges over which the spring rate is low.

The suspension system for a vehicle, especially a truck or other material handling vehicle, is subjected to two different load conditions. One occurs when the vehicle is empty, i.e., devoid of any payload. In this situation, the suspension system must support those vehicle components that comprise the sprung mass and isolate that mass from any shock or impact load applied to the unsprung mass, which includes the vehicle's wheels. The unloaded condition, therefore, imposes a given initial load on the suspension system and results in an initial displacement of the spring device, which is a part of the suspension system. The second condition occurs when the vehicle is loaded, i.e., carrying a payload. The static load on the suspension system then becomes the usual sprung mass of the vehicle itself plus the weight of the payload. The spring rate, i.e., the amount of force per unit of displacement of the spring, is a function of the fluid pressure in the hydro-pneumatic unit, the rate, or the slope of the force-displacement curve, increasing as the displacement increases. However, with hydro-pneumatic units of the prior art this inherent increase in the spring rate resulted in a soft, smooth and controlled ride when the vehicle was loaded.

It is, therefore, an object of the present invention to provide a hydro-pneumatic suspension unit which will provide smooth and controlled ride characteristics under both loaded and unloaded conditions.

It is another object of the present invention to provide a hydro-pneumatic suspension unit wherein the seals are subjected to high pressure differentials only when stationary.

These and other objects and many of the attendant advantages will become more readily apparent from a perusal of the following specification and the accompanying drawings, wherein;

FIG. 1 is a longitudinal section through one embodiment of the present invention, FIG. 2 is a graph of the force-displacement curve, i.e., the capacity curve, provided by the suspension unit of the present invention, and FIG. 3 is a view, similar to that of FIG. 1, showing a second embodiment of the present invention.

Referring now in detail to the embodiment shown in FIG. 1, the suspension unit is indicated generally at 10, and comprises a cylinder 12 having a bore 14 therein. A piston 16 having a rod portion 18 is slidably retained within the bore 14. The rod portion 18 extends through an opening 20 in one end of the cylinder 12 and is provided with an eye 22. A similar eye 24 is attached to the top of the cylinder 12. These eyes 22 and 24 are utilized to pin the unit between the unsprung and sprung masses of the vehicle. A blind bore 26 extends from the upper or head face of the piston 16 and into the rod portion 18. A snap ring or stop 28 is retained within a groove 30 formed in the wall of the blind bore 26. A floating piston 32 is positioned within the blind bore 26 between the snap ring 28 and the closed end of the blind bore. Sealing means 34 is carried by the floating piston 32 and sealingly engages the walls of the blind bore 26.

The piston 32 defines a closed volume or chamber with the blind bore 26. A charging valve 36 is provided near the outer end of the rod portion 18 to permit the above-mentioned chamber to be charged with a compressible fluid $F_1$ under pressure $P_1$.

A restricted opening or orifice 37 is provided in the piston 16 extending from the head face to the rod face thereof. The cylinder 12, including that portion of the blind bore 26 above the floating piston 32, is partially filled with a non-compressible fluid $F_2$. A second charging valve 38 is provided in the top of the cylinder 12 to permit the confined space above the level of the non-compressible fluid $F_2$ to be charged with a compressible fluid $F_3$ under a pressure $P_3$.

The pressures $P_3$ and $P_1$ of the compressible fluids $F_3$ and $F_1$ are chosen so that when the vehicle is unloaded $P_1$ is greater than $P_3$. That is, when the vehicle is empty the force provided by the fluid $P_3$ alone will support the sprung mass. When the vehicle is loaded, i.e., carrying a payload, the pressure of fluid $F_3$ has increased to the point that $P_3$ is equal to $P_1$. The effect of this is, as shown in FIG. 2, to alter the force-displacement curve. The slope of the curve, i.e., the spring rate, increases as the displacement increases until the pressures $P_1$ and $P_3$ become equal and the curve breaks with the slope being flattened out or decreased in response to an increase in displacement.

The embodiment of FIG. 1 operates in the following manner. When the vehicle is empty, the weight of the sprung mass tends to collapse the unit 10. However, the pressure $P_3$ of the compressible fluid $F_3$ exerts sufficient force to support the empty vehicle without moving piston 32 downward from stop or snap ring 28. The pressure $P_1$ of the compressible fluid $F_1$ has no effect on the unit in the unloaded condition because the pressure $P_1$ is greater than $P_3$ and the floating piston 32 is held against the snap ring 28 by the pressure of fluid $F_1$. The snap ring 28, therefore, carries the entire force exerted by the pressure differential acting on the floating piston 32. As an impact load is applied to the unit 10 tending to collapse it, the fluid $F_3$ will be further compressed forcing the non-compressible fluid through the orifice 37 into the space below the piston 16. Sudden removal of the load will cause the unit 10 to extend, which the non-compressible fluid $F_2$ will not allow at a rate faster than this fluid $F_2$ can flow through the orifice 37 to the upper side of the piston 16. The non-compressible fluid, therefore, functions as a damper. When the vehicle is loaded with its capacity payload, the force exerted by the combined weight of the sprung mass and the payload ideally would collapse the unit 10 and compress the fluid $F_3$ to the point that the pressure $P_3$ is equal to the pressure $P_1$ of the fluid $F_1$. Under these circumstances the application of a shock or impact load which tends to collapse the unit will result in additional compression of the fluid $F_3$ above the piston 16, with the further result of an increase in the pressure $P_3$. As soon as pressure $P_3$ exceeds pressure $P_1$, piston 32 will begin to move downward in the bore 26. The volume of compressible fluid supporting the total load is thereby increased as the floating piston becomes operable and accounts for the sudden change in the spring rate.

Referring now to the embodiment shown in FIG. 3, the unit is again shown at 310 and comprises a cylinder 312 having a bore 314. A piston 316 having a rod portion 318 is slidably retained within the bore 314. The piston is provided with an orifice 337 extending axially therethrough and additionally has a port 360 with a check valve 362 positoned therein to permit free flow of fluid from the head side of the piston to the rod side, while blocking fluid flow in the opposite direction. A snap ring or stop 348 is retained with a groove 350 formed in the wall of the bore 314. A floating piston 342 provided with sealing means 344 is slidable between the snap ring 348 and the top of the cylinder 312.

The cylinder 312 is partially filled with a non-compressible fluid $F_2$. The chamber 370 formed above the level of fluid $F_2$ and below the floating piston 342 is charged with a compressible fluid $F_3$ through a charging valve 366. The chamber 372 formed within the cylinder 312 above the floating piston 342 is also charged with a compressible fluid $F_1$ through a charging valve 368. A small quantity of non-compressible fluid is also present in the chamber 372 to assure lubrication of the floating piston 342 and to aid the sealing means 344 in preventing fluid leakage around the floating piston.

The operation of the embodiment shown in FIG. 3 is similar to that of FIG. 1. When the vehicle is unloaded and the unit 310 is subjected only to the weight of the unsprung mass of the vehicle, the pressure $P_3$ of the compressible fluid $F_3$ exerts sufficient force to support the load imposed thereby. Since the pressure $P_1$ in the chamber 372 is greater than $P_3$, under this condition, the floating piston 342 will be held against the snap ring 348. When a payload is added to the vehicle, the unit 310 will be partially collapsed causing compression of the fluid $F_3$ in the chamber 370 until $P_3$ is equal to $P_1$. Any further collapse of the unit occasioned by the application of an impact load, will result in compression of the compressible fluids in both chambers 370 and 372. The increased volume of compressible fluid then functioning to resist collapse of the unit is substantially increased and the spring rate is thereby lowered. All other operations of this embodiment are the same as those discussed in connection with the embodiment of FIG. 1, except for the additional port 360 and the check valve 362. This modification, which may be incorporated into the embodiment of FIG. 1 if desired, assures that collapse of the unit 310 is resisted only by the resilient characteristics of the compressible fluids and not be the viscous characteristics of the non-compressible fluid. That is, upon collapse of the unit, the check valve 362 opens and permits the fluid to flow freely to the rod end chamber. However, upon rebound or extension of the unit, the check valve 362 will close and require the non-compressible fluid $F_2$ to flow through the restricted orifice 337. Thus, the fluid $F_2$ will provide damping upon rebound but will have no effect on the collapse of the unit.

Referring now to the embodiments of both FIGS. 1 and 3, it should be noted that the floating pistons 32 and 342 are always stationary whenever $P_1$ is greater than $P_3$ is very small and the movement of the floating pistons is required that they prevent leakage due to a high pressure differential. When the floating pistons 32 and 342 are in motion, the pressure differential between $P_1$ and $P_3$ is very small and the movement of the floating pistons is in the direction necessary to equalize the pressures.

Thus, it can be seen that the environment of the seals 34 and 344 is inherently conducive to good sealing characteristics, thereby increasing the effectiveness and life of these sealing means, which because of their location are difficult to replace.

While there are in this application specifically described a plurality of forms which the invention may assume in practice, it will be understood that these forms are shown for purposes of illustration and that the invention may be modified and embodied in various other forms without departing from its spirit or the scope of the appended claims.

What is claimed is:
1. A suspension unit for a vehicle comprising
   a cylinder,
   a piston, having a rod portion reciprocably retained within said cylinder and defining therewith a head chamber and a rod chamber,
   a floating piston reciprocably retained in one of said piston and said cylinder, and defining therewith a third chamber,
   said rod chamber being filled with a non-compressible fluid,
   said head chamber being filled with a non-compressible and compressible fluids under pressure,
   means for permitting the flow of non-compressible fluid between said head and rod chambers,
   said third chamber being filled with a compressible fluid under a pressure greater than that in said head chamber,
   and stop means limiting the movement of said floating piston under the force of said greater pressure,
   whereby collapse of said unit results in compression of said compressible fluid in said head chamber only until the pressure therein equals the pressure in said third chamber, whereafter further collapse of said unit results in further compression of compressible fluid in both said third chamber and said head chamber.

2. A suspension unit according to claim 1 wherein said means comprises a restricted orifice extending axially through said piston, whereby extension of said unit is restricted by the flow of said non-compressible fluid from said rod chamber to said head chamber.

3. A suspension unit according to claim 2 wherein said piston has a port therethrough and a check valve position in said port for permitting fluid flow only from said head chamber to said rod chamber.

References Cited by the Examiner
UNITED STATES PATENTS
2,769,632  11/1959  De Carbon _ _ _ _ _ _ _ _ _ _ _ _  267—64

ARTHUR L. LA POINT, *Primary Examiner.*

R. M. WOHLFARTH, *Assistant Examiner.*

UNITED STATES PATENT OFFICE
CERTIFICATE OF CORRECTION

Patent No. 3,304,076                                February 14, 1967

Richard A. Doversberger

It is hereby certified that error appears in the above numbered patent requiring correction and that the said Letters Patent should read as corrected below.

Column 3, line 51, for "$P_3$ is very small and the movement of the floating pistons" read -- $P_3$. Thus, the seals 34 and 344 are not moving when it --; column 4, line 46, "tion" read -- tioned --.

Signed and sealed this 17th day of October 1967.

(SEAL)

Attest:

Edward M. Fletcher, Jr.

Attesting Officer

EDWARD J. BRENNER

Commissioner of Patents